United States Patent Office 3,441,637
Patented Apr. 29, 1969

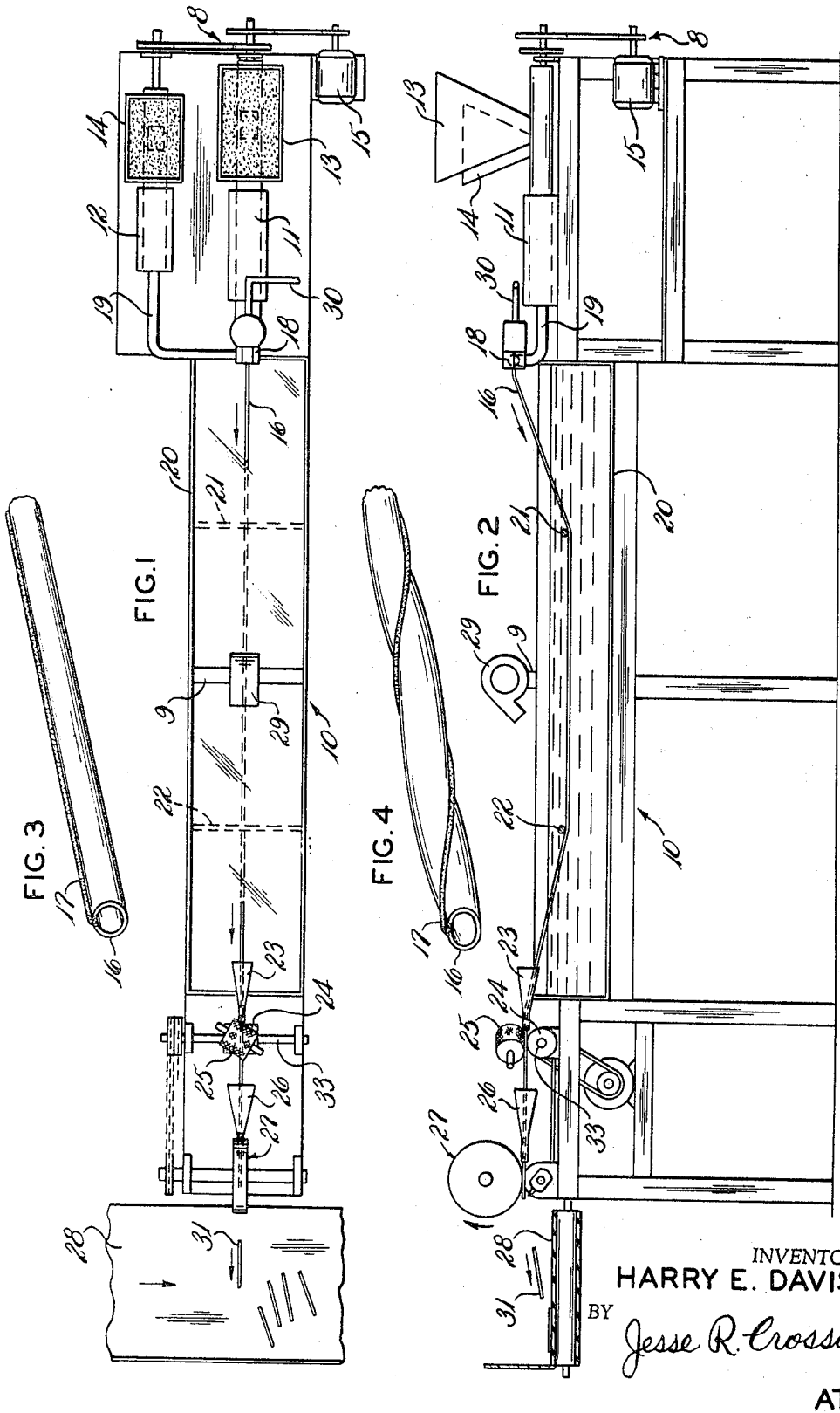

3,441,637
METHOD AND APPARATUS FOR MAKING STIRRERS
Harry E. Davis, 544 Vinita Ave., Akron, Ohio 44320
Filed Nov. 22, 1966, Ser. No. 603,075
Int. Cl. B29d 23/04; B32b 1/08; A47g 19/22
U.S. Cl. 264—95                                3 Claims

ABSTRACT OF THE DISCLOSURE

The present invention pertains to stirrers of the type adapted for stirring the ingredients in drinking glasses or the like. More particularly the invention relates to a continuous method and apparatus for extruding such stirrers having a spirally striped and undulated body which is subsequently shaped and is substantially the same as shown in Harry E. Davis patent, D. 199,298, dated October 6, 1964, for Drinking Straw.

---

As will be seen by reference to the present specifications and drawings applicant's method and apparatus comprise a pair of extruding machines adapted to extrude such thermo-plastic materials as polypropylene, polyethylene and the like, one of the extruders forming a main tubular body portion, that is round in cross-section, and the other extruder adapted to extrude a thin narrow strip of similar material as that of the main body portion but a different color. It will also be seen that the said thin narrow strip is discharged into the die of the extruder that forms the said main body so that the thin narrow strip is permanently attached to the outer surface of the main body and extends parallel with the axis thereof.

As is well known by those familiar with the operation of extruding plastic material, such material is discharged from extruders in a hot viscous condition. Means, described in detail hereinafter, is adapted to subject the said tubular body to longitudinal stretch and to change its cross-section from round to elliptical shape, also to progressively solidify the said materials, composing the body, and to rotate the tubular body about its axis whereby the main body portion is twisted into undulations lengthwise thereof and the thin narrow strip is changed from a straight course lengthwise of the main body to a spiral course thereabout.

The effects just recited on the combined main body and strip occur simultaneously and progressively along a short length of the body and strip as these are drawn forward and the changing occurs during the period the said short length of plastic material is changing from a hot viscous condition to a cooler and substantially less viscous condition. The means employed in the present invention are adapted to so control the steps of the method that the progressive changing of the round cross-section of the tubular body to elliptical cross-section is arrested at the desired degree of change at which point the plastic involved becomes solidified to the desired condition and the tubular body is drawn forward and passed into severing means where it is cut into stirrers, of predetermined length, the stirrers being discharged, from the severing means, onto a conveyor in such fashion that the axes of the stirrers are substantially at right angles to the sides of the conveyor, the stirrers being collected near the discharge end of the conveyor in suitable bunches for efficient manual transfer into containers.

A principal object of the invention is to provide automatic means for a continuous method of producing stirrers of the kind disclosed in the Davis patent referred to hereinabove.

Another object of the invention is to provide a method wherein stirrers of the class referred to and of different kinds of same may be automatically and simultaneously produced, co-mingled and gathered into bunches preparatory to packaging.

Another object of the invention is to provide a stirrer of the kind described that obtains the maximum resistance to bonding and collapsing from a given amount of material.

A further object of the invention is to provide a method of producing stirrers of the character described that is more economical than prior methods.

Other objects and advantages of the invention will be apparent from the following description and by reference to the accompanying drawings, wherein:

FIG. 1 is a plan view of apparatus embodying the present invention, showing only a portion of a conveyor belt;

FIG. 2 is a side elevational view of the apparatus shown in FIG. 1 the conveyor means being shown in cross-section;

FIG. 3 is a perspective view of stirrer material as it leaves an extruder die;

FIG. 4 is a perspective view of the stirrer body in its final form;

Figure 5:
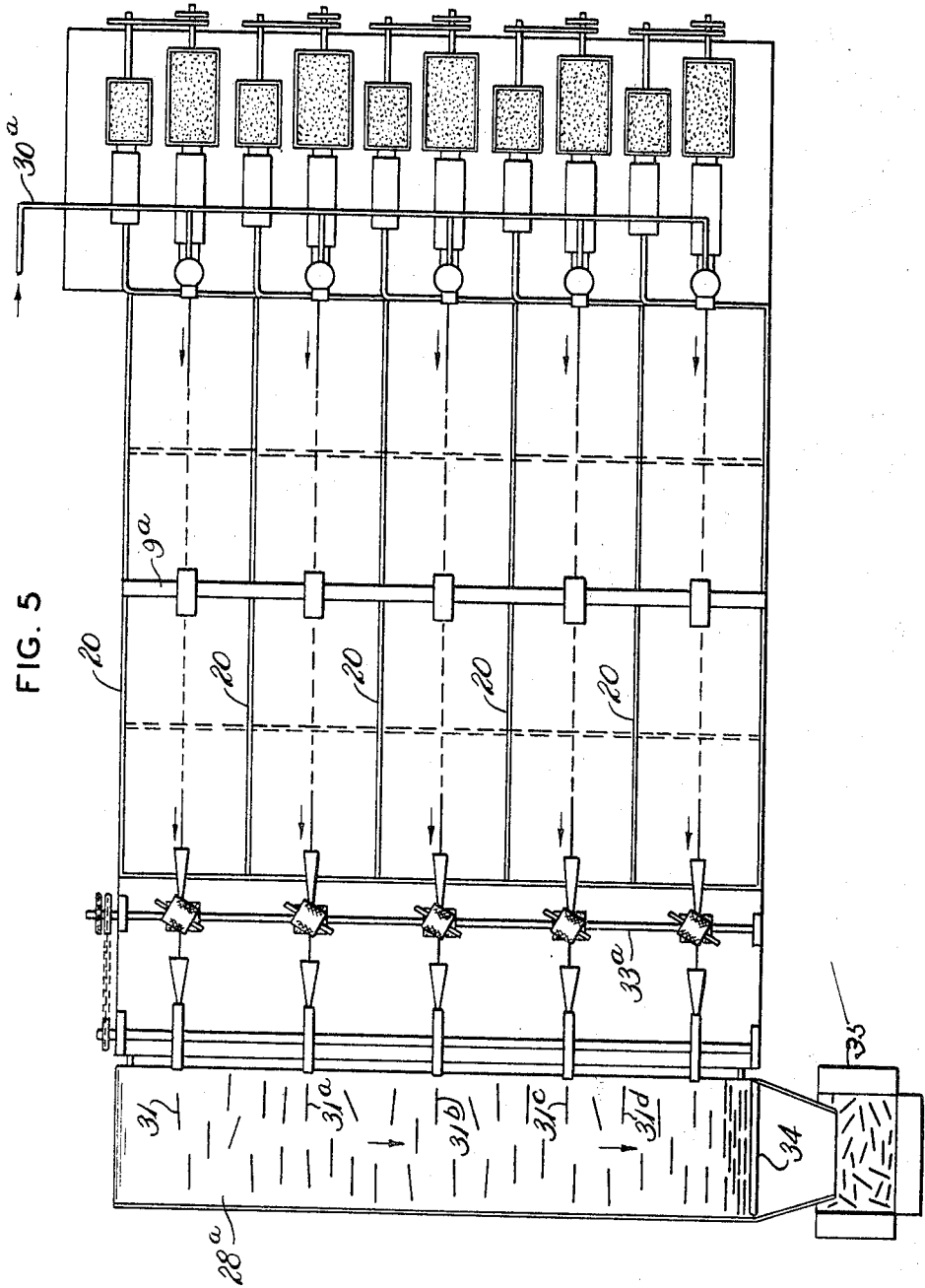
FIG. 5 is a plan view of a plurality of the apparatus shown in FIGS. 1 and 2 arranged side by side and showing diagrammatically the discharge of stirrers on a common conveyor belt.

Referring now to the drawings in detail it will be seen by reference to FIGS. 1 and 2 that the apparatus referred to generally as 10 comprises two extruders 11 and 12 which may be of any type adapted to extrude plastic material in tubular form. Extruders 11 and 12 have the usual hoppers 13 and 14 respectively to feed granular plastic material to the extruder's barrels and screws as will be understood by those familiar with the art. Suitable screw driving mechanism is provided by a motor 15 and the required linkage and gears are referred to as a group 16 all of which will also be understood by those familiar with the use of extruding machines. It is to be understood that the barrels of the extruders are heated by suitable wiring, voltage control and insulation all of which are well known to the art.

Hopper 13 is supplied with granular plastic material that feeds the barrel and screw of extruder 11. Hopper 14 is supplied with granular plastic material that feeds to the barrel and screw of extruder 12. The plastic material in hoppers 13 and 14 are of different colors. Extruder 11 is adapted to form, by extrusion, an uninterrupted, round in cross-section, tubular strip 16 (see FIG. 3).

Extruder 12 is adapted to extrude a thin narrow strip 17 that is discharged into the die 18 of extruder 11 through an elongated die 19. It is to be understood that an extruder mandrel, not shown, of extruder 11 extends substantially through die 18 and that strip 17 initially contacts the wall of tubular strip 16 at a point where the wall of strip 16 is supported by said mandrel. The rate of extrusion of the tubular strip 16 and the thin narrow strip 17 is so coordinated, by means well known to the art, that strip 17 progressively attaches itself to the outer surface of strip 16 parallel with the axis of the latter. The coordinating means just referred to include extruder barrels, type of extruder screws and their speed of rotation, temperature, material being extruded, etc. and it is considered a detailed description of those means is unnecessary for an understanding of the present invention. If found desirable one or more extruders 12 may be employed and thin strips of different colors fed into die 18 in the same manner as strip 17 is fed into said die.

An elongated water tank 20 is provided containing water at a controlled temperature of approximately 70° F. The extruded hot plastic in tubular form is led through the water in the tank under cross-rods 21 and 22 and out of the water through a guide funnel 23 into the bite of a pair of knurled rolls 24, 25 which are adapted to advance and rotate strip 16 with strip 17 attached about the strip's axis. Rolls 24, 25 project the strip forward through a second guide funnel 26 into severing mechanism, referred to generically as 27, which is adapted to cut strip 16 into predetermined stirrer lengths, and as indicated hereinbefore, the stirrers 31 are ejected from the severing means in such manner that they fall upon a conveyor 28 and are disposed thereon with the axis of the stirrers substantially parallel to each other and at a right angle to the sides of the conveyor.

The hot plastic entering the water raises the temperature of the water slightly above the temperature desired and accordingly a fan 29 is disposed above the tank on a support 9 and directs an air flow on the surface of the water whereby a build up of water temperature is controlled. It is to be understood, however, that the invention contemplates other means, which may be found satisfactory, for controlling the water temperature.

Referring again to extruder 11 internal air pressure is created in the extruded tubular strip by passing air through the extruder mandrel from a suitable source through an air line 30. Accurate control of the air flow is effected by a micro-valve (not shown) in the air line and, as will be understood, back-pressure creates the internal air pressure as is well known in the art of extrusion and accordingly will not be described in detail.

The function of the internal pressure is to maintain the tube in round cross-section and desired diameter as the tubular strip enters the water, where, as is well known, plastics of the type referred to hereinabove, solidifies as it cools. This solidifying progresses in tube 16 as the tube is led under the water in contact with cross-rod 21. Rod 21 is so disposed that tube 16 is still sufficiently viscous for its contact with rod 21 to change its cross-sectional shape from round to elliptical. The degree of said change from round to elliptical is controlled by the force of contact between rod 21, tube 16 and the viscosity of the tube and it will be appreciated that this is an important element since tube 16 reaches its final rigidity, in the present method, in approximately 6" of its travel in the water. Thus from a short distance, from rod 21 and beyond the tube rotating rolls 24, 25 the said tubular strip becomes a substantially rigid rotating pipe that rotates the elliptical tube 16 about its axis at the tube approaches and leaves rod 21 whereby the tube body is twisted into permanent undulations and the colored strip 17 turns with the body 16 thus forming a colored spiral stripe longitudinally of the rigid tubular strip 16.

Coming now to the tube rotating rolls 24, 25 it is to be understood that roll 24 is driven from a motor 32 and roll 25 is an idler roll, these rolls being supported by suitable means well within the skill of the art and therefore not shown. The shaft 33 of roll 24 is at a right angle to tank 20 and the direction of travel of tubular strip 16. The shaft of idler roll 25 is angular to that of shaft 33 and accordingly strip 16 passing through said rolls tends to run sidewise from between them, however, it is to be noted that the outlet end of funnel 23 is sufficiently close to the bite of the rolls to prevent such escape therefrom.

While various tubular strip severing mechanisms are within the contemplation of the present invention the severing means 27 here shown generally and diagrammatically is disclosed in detail on p. 11, lines 5–25, of my joint co-pending application Ser. No. 363,178; now Patent No. 3,291,009, filed Apr. 28, 1964, Method and Apparatus for Making Drinking Straws, applicants Harry E. Davis and Fred B. Pfeiffer, and reference is made thereto for a description of one type of severing means contemplated by the present invention.

An important feature of the present invention is illustrated in FIG. 5 wherein a plurality of the apparatus shown in FIGS. 1 and 2, are arranged side by side and discharge the stirrers 31 on a conveyor. It will be noted that the shaft 33, fan support 9 and conveyor 28, shown in FIG. 1 are modified to be common to each of the plurality of units 20 shown in FIG. 5 and are identified by reference numerals 33a, 9a and 28 respectively. In this arrangement various colored strip 17 and body 16 material are used with the different extruders so that different colored stirrers referred to generally as 31 are co-mingled preparatory to packaging. Such mixtures of colors is highly desirable in the trade and before the present invention could only be obtained by extra labor. By further reference to FIG. 5 it will be seen that a baffle 34 near the discharge end of the conveyor backs up the stirrers in parallel relation whereby a workman can efficiently manually transfer the stirrers to suitable containers. In the event defective stirrers are approaching the baffle, as may occur at the start of the operation of the present method, it is to be understood that the baffle may be manually removed to permit the defective stirrers to fall into a scrap container 35.

What is claimed is:

1. A method of making stirrers of a thermoplastic material comprising the steps of:
   (e) extruding said material in heated plastic condition in a continuous strip of tubular form that is round in cross-section,
   (b) subjecting the strip to internal air pressure while said material is heated and pliable,
   (c) gradually cooling the strip by drawing it into water thereby converting the strip from a flexible to a rigid condition,
   (d) progressively changing the cross-sectional shape of the said strip from round to elliptical and rotating the strip about its axis during the interval when the material, of which the strip is composed, is changing from a viscous condition to a substantially rigid condition,
   (e) delivering said strip in its rigid condition progressively to severing means and there cutting the strip into stirrers of predetermined length,
   (f) ejecting the stirrers from severing means onto a traveling conveyor in such manner as to cause the stirrers to lie thereon with their axes at substantially right angles to the sides of the conveyor, and
   (g) obstructing the travel of the stirrers on the conveyor thereby gathering them in a bunch convenient for packaging.

2. A method according to claim 1 in which a plurality of the apparatus employed in the method of claim 1 is concurrently operated, each making said stirrers of a different color and discharging the different colored stirrers on a common traveling conveyor belt whereby the various stirrers become co-mingled.

3. A method of making stirrers comprising the steps of:
   (a) extruding a continuous main tubular body round in cross-section and composed of thermoplastic material from a first extruder,
   (b) concurrently with the extrusion of the main body extruding a continuous strip, composed of thermoplastic material small in width relative to the circumference of said body from a second extruder, and discharging said small strip into a die of the first extruder thereby attaching the small strip to the surface of the main body,
   (c) said thermoplastic material being hot and viscous as it comes from the extruder die,
   (d) drawing the tubular body into cooling means and thereby gradually and progressively changing the thermoplastic, of which the body is composed, from a viscous to its non-viscous condition, and
   (e) concurrently with said cooling, changing the cross-sectional contour of the tubular body from round to elliptical and revolving the strip about its axis thereby forming permanent undulations in the said body throughout its length and causing said thin strip to follow a spiral course lengthwise of the tubular body.

References Cited

UNITED STATES PATENTS

| | | | |
|---|---|---|---|
| 2,233,987 | 3/1941 | Orsini | 264—209 X |
| 2,452,884 | 11/1948 | Werner | 264—178 |
| 3,023,461 | 3/1962 | Sherman | 264—173 X |
| 3,376,181 | 4/1968 | Larson | 264—150 X |

ROBERT F. WHITE, *Primary Examiner.*

A. M. SOKAL, *Assistant Examiner.*

U.S. Cl. X.R.

264—99, 150, 151, 173, 178, 209, 295